United States Patent [19]

Yamada

[11] Patent Number: 4,802,125
[45] Date of Patent: Jan. 31, 1989

[54] MEMORY ACCESS CONTROL APPARATUS

[75] Inventor: Ikuo Yamada, Tokyo, Japan

[73] Assignee: NEC Corporation, Tokyo, Japan

[21] Appl. No.: 122,698

[22] Filed: Nov. 19, 1987

[30] Foreign Application Priority Data

Nov. 21, 1986 [JP] Japan ............................... 61-278442

[51] Int. Cl.⁴ .............................................. G11C 13/00
[52] U.S. Cl. .................................. 365/189; 365/230; 365/238; 364/200
[58] Field of Search ................ 365/154, 189, 190–191, 365/230, 231, 238; 364/200

[56] References Cited

U.S. PATENT DOCUMENTS 4,675,850  6/1987  Kumanoya et al. ................ 365/189

Primary Examiner—Terrell W. Fears
Attorney, Agent, or Firm—Foley & Lardner, Schwartz, Jeffery, Schwaab, Mack, Blumenthal & Evans

[57] ABSTRACT

A memory access control apparatus has a plurality of request reception sections, respectively connected to a plurality of units for supplying requests, for receiving a block read request from the corresponding units, and dividing the block read request into a plurality of read requests and outputting the divided read requests, a selector for selecting one of outputs from the request reception sections and outputting the selected output, a request processing section for processing the request output from the selector and outputting reply data to a corresponding unit, and a main memory connected to the request processing section. The request reception section has a counter for counts the read requests of the block read request and outputting the obtained count to the request processing section through the selector, and the request processing section has a miss detecting circuit for detecting a miss during processing of a block read request, a determining circuit for determining by an output from the counter the number of replies to be supplied to the unit that has sent the request when the miss detecting circuit detects a miss, and a circuit for receiving an output from the miss detecting circuit and outputting to the request reception section a signal for invalidating requests following the block read request, among the plurality of read requests, in which a miss has occurred.

5 Claims, 9 Drawing Sheets

| FIG. 1 A |
| FIG. 1 B |

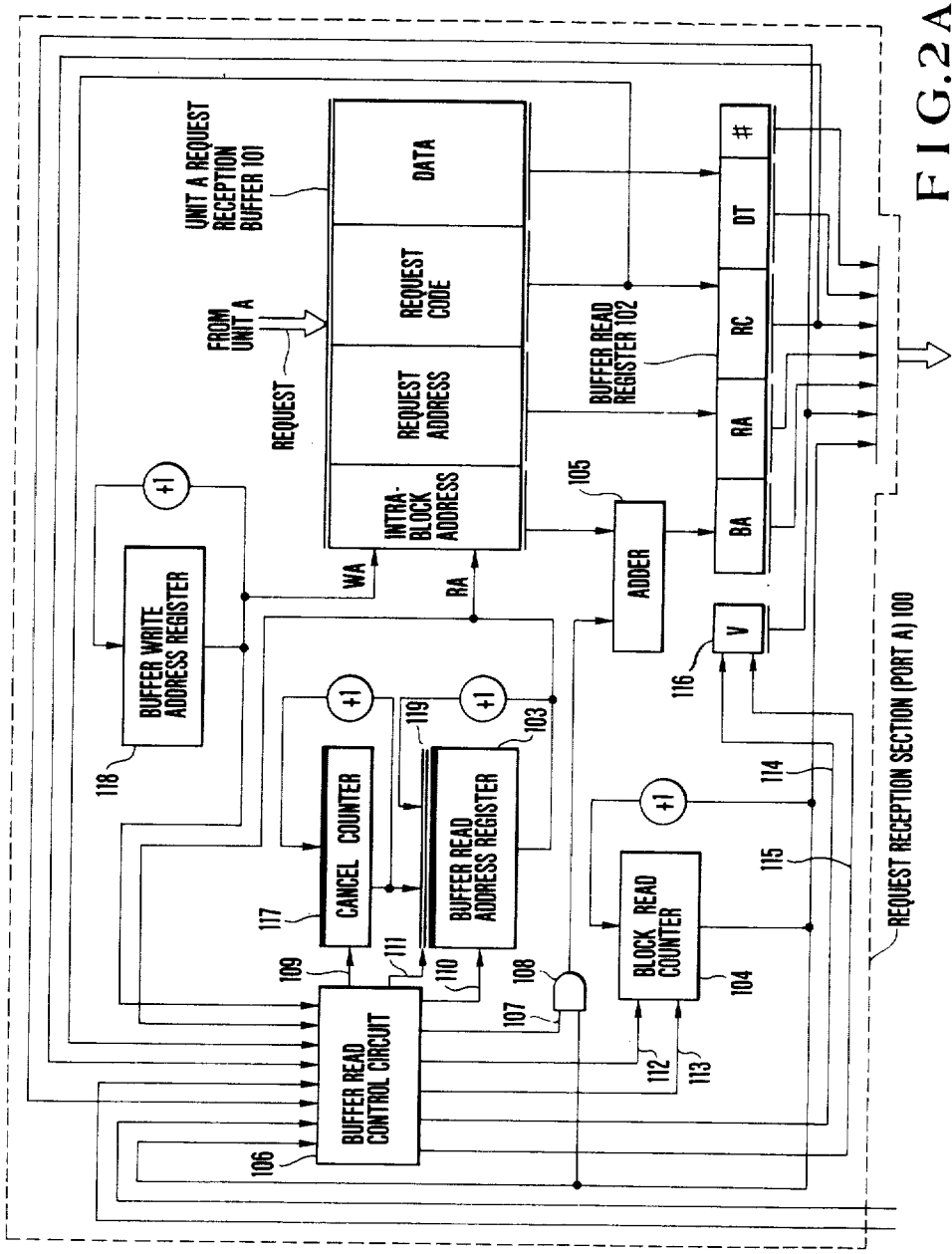

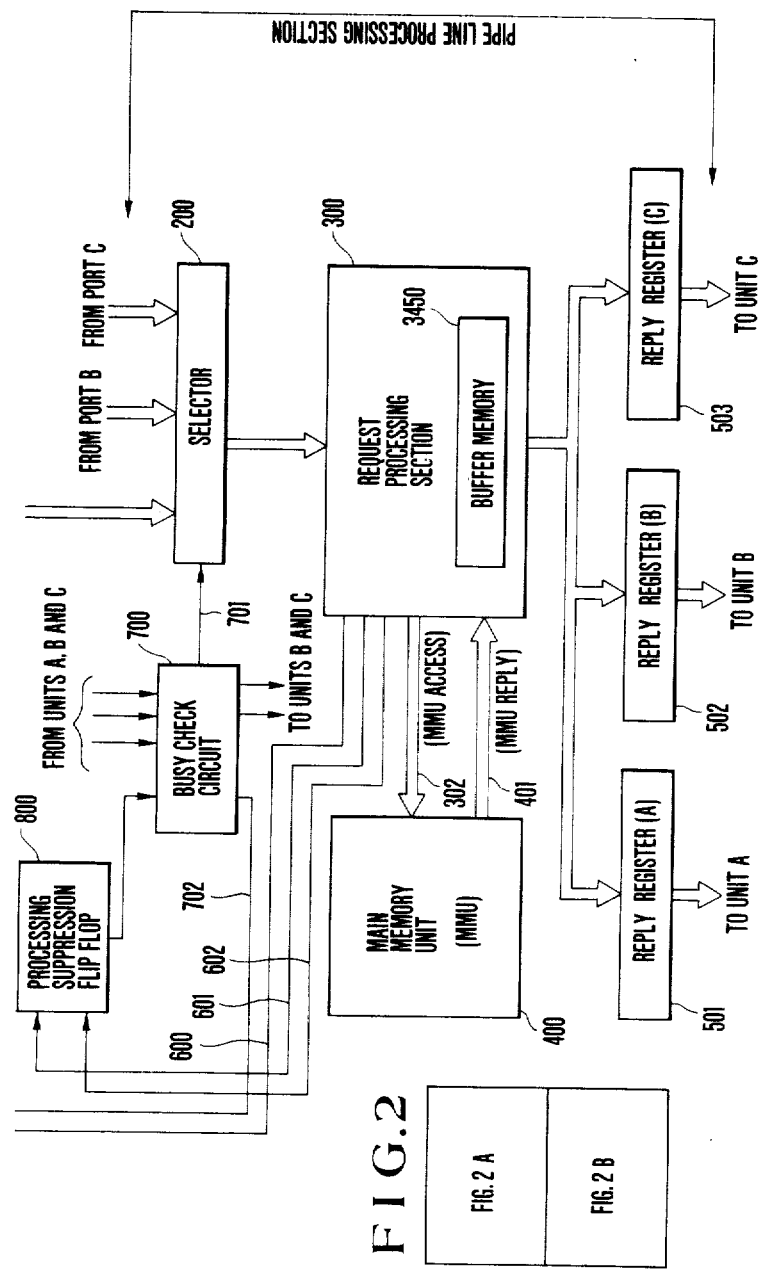

| FIG. 3 A |
|----------|
| FIG. 3 B |

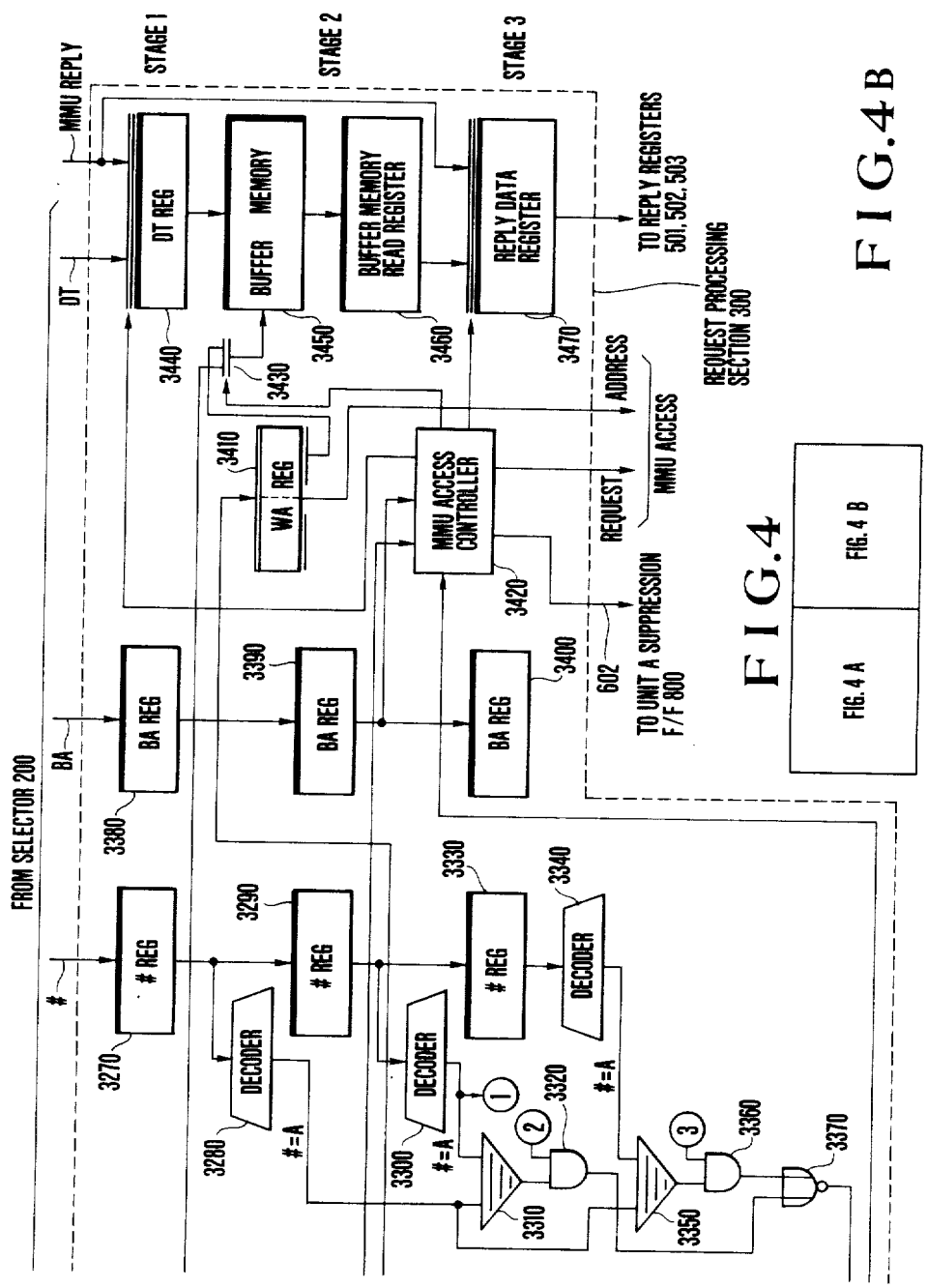

MEMORY ACCESS CONTROL APPARATUS

BACKGROUND OF THE INVENTION

The present invention relates to a memory access control apparatus and, more particularly, to a memory access control apparatus wherein block read processing is improved.

FIGS. 1A and 1B show an example of a conventional memory access control apparatus.

Referring to FIGS. 1A and 1B, a request reception port section (to be referred to as a port A hereinafter) 100 encircled by a broken line receives a request from a unit A and outputs data about a request address, request code, and intra-block address to a selector 200. The selector 200 also receives outputs from ports B and C that receive requests from units B and C, respectively, and have the same configurations as that of the port A. The selector 200 is connected to a busy check circuit 900 for checking availability of the units A, B, and C. The busy check circuit 900 performs busy check of the requests from the units A, B, and C, and outputs a selection signal 901 for selecting the unit A, B, or C that has passed the busy check to the selector 200 and a unit available signal 902 indicating that the unit A, B, or C is available to the corresponding port A, B, or C.

An output from the selector 200 is input to a request processing section 300 for processing a selected request. The request processing section 300 has a buffer memory 301. The processing section 300 is connected to a main memory unit (MMU) 400 by an MMU access line 302 for accessing the MMU 400 and an MMU reply line 401 for transmitting a reply from the MMU 400. An output from the processing section 300 is connected to reply registers 501, 502, and 503 corresponding to the units A, B, and C, respectively.

The selector 200, the request processing section 300, the main memory unit 400, and the reply registers 501 to 503 constitute a pipe line processing section.

The port A 100 comprises a unit A request reception buffer (to be referred to as a buffer hereinafter) 101 connected to the unit A, a buffer read register 102 connected to the output of the buffer 101, a buffer address register 103 for supplying an address to the buffer 101, a block read counter 104, an adder 105, a buffer read control circuit 106, and an AND gate 108.

The port A 100 operates in the following manner.

A request supplied from the unit A to the buffer 101 includes read, write, and block read requests. In the block read request, one block consists of 64 bytes (B) which are decomposed to eight 8-bytes read requests (to be referred to as 8B read requests). When a single block read request is supplied, the buffer read register 102 performs reading from the buffer 101 eight times.

The read address of the buffer 101 is supplied from the buffer read address register 103. When the request is a block read request, the content of the buffer read address register 103 does not change until read operation in response to one block read request is completed and is updated when readout in response to the 8th 8B read request is finished. When the request is a request other than the block read request, the content of the buffer read address register 103 is updated every time read access to the buffer 102 is performed.

The block read counter 104 has a value of 0 to 7 and counts eight 8B read requests in the case of a block read request. Therefore, the content of the counter 104 is always "0" at the start of the block reading.

The adder 105 adds an output representing the intra-block address of the buffer 101 and an output from the block read counter 104, and supplies the obtained sum to a corresponding bit position of the buffer read register 102. The buffer read control circuit 106 receives an output supplied from the buffer 101 to the buffer read register 102 and an output from the block read counter 104, and outputs an update signal 109 for the buffer read address register 103 and a valid signal 107 representing a block read request.

The buffer read control circuit 106 controls read operation of the buffer 101 in the following manner.

(1) When the request is other than a block read request, the update signal 109 becomes "1" every time read access to the buffer 101 is performed and the valid signal 107 becomes "0". As a result, the intra-block address in the buffer 101 is read out unchanged.

(2) When the request is a block read request, the valid signal 107 is set "1", and an output from the block read counter 104 is supplied to the adder 105 through the AND gate 108. Only when the output from the block read counter 104 is "7" and read access to the buffer 101 is performed in response to an 8B read request, the update signal 109 is set "1" so as to update the intra-block address 8 times.

When the unit A is selected by the selector 200, the request processing section 300 processes the request supplied from the port A 100. When data is not registered (to be referred to as a "miss" hereinafter) in the buffer memory 301, the request processing section 300 performs MMU access to the main memory unit 400, and in response the main memory unit 400 supplies block data to the buffer memory 301 by an MMU reply.

In the case of a block read request, when a hit has occurred, that is, when a miss has not occurred, the port A 100 outputs an 8B read request to the request processing section 300 eight times. The request processing section 300 processes the eight 8B read requests and sends reply data 8 times to the unit A that has supplied the request.

When a miss has occurred during a block read operation, the request processing section 300 sends a block read request to the main memory unit 400 by MMU access, and in response the main memory 400 registers 64B data in the buffer memory 301 by MMU reply. The request processing section 300 sends the reply data which is a first 8B data of the block to the unit A. The port A 100 outputs the remaining 8B read requests to the request processing section 300.

As described above, in conventional block read request processing, when a miss has occurred, reply data is supplied to a unit that has supplied the request and simultaneously data is registered in the buffer memory 301 of the request processing section 300. In such a conventional method, when a miss has occurred during a block read operation, all the reply data can be sent to a unit that has sent the request at once. However, since the block read request is executed as eight 8B read requests irrespective of occurrence of a hit or miss, wasteful processing is performed when a miss has occurred, resulting in a poor performance.

SUMMARY OF THE INVENTION

It is an object of the present invention to eliminate the above drawbacks of the conventional technique and to provide a memory access control apparatus wherein wasteful processing upon occurrence of a miss during processing of a block read request is eliminated, thereby improving the processing capacity.

In order to achieve the above object, the memory access control apparatus according to the present invention comprising: a plurality of request reception sections, connected to a plurality of units for supplying requests, for receiving a block read request from corresponding ones of the units, dividing the block read request into a plurality of read requests and outputting the divided read requests; selecting means for selecting one of the outputs from the plurality of request reception sections and outputting the selected output; and a request processing section for processing the request output from the selecting means. The memory access control apparatus also comprises counter means, miss detecting means, determining means, and buffer read register invalidating signal output means. The counter means counts the plurality of read requests and outputs the obtained count to the request processing section through the selecting means. The detecting means detects a miss during processing of the block read request by the request processing section. The determining means determines by an output from the counter means the number of replies to be supplied to the unit that has sent the request when the miss detecting means detects a miss. The buffer read register invalidating signal output means receives an output from the miss detecting means and outputs a signal for invalidating a plurality of requests following the block read request to the request reception section.

BRIEF DESCRIPTION OF THE DRAWINGS

FIGS. 2, 2A and 2B are block diagrams showing a memory access control apparatus according to an embodiment of the present invention;

FIGS. 4, 4A and 4B are circuit diagrams of an FIG. 2; and

DETAILED DESCRIPTION OF THE PREFERRED EMBODIMENT

A preferred embodiment of the present invention will be described in detail with reference to the accompanying drawings.

FIGS. 2A and 2B are block diagrams showing a memory access control apparatus according to an embodiment of the present invention.

Figure 1A:
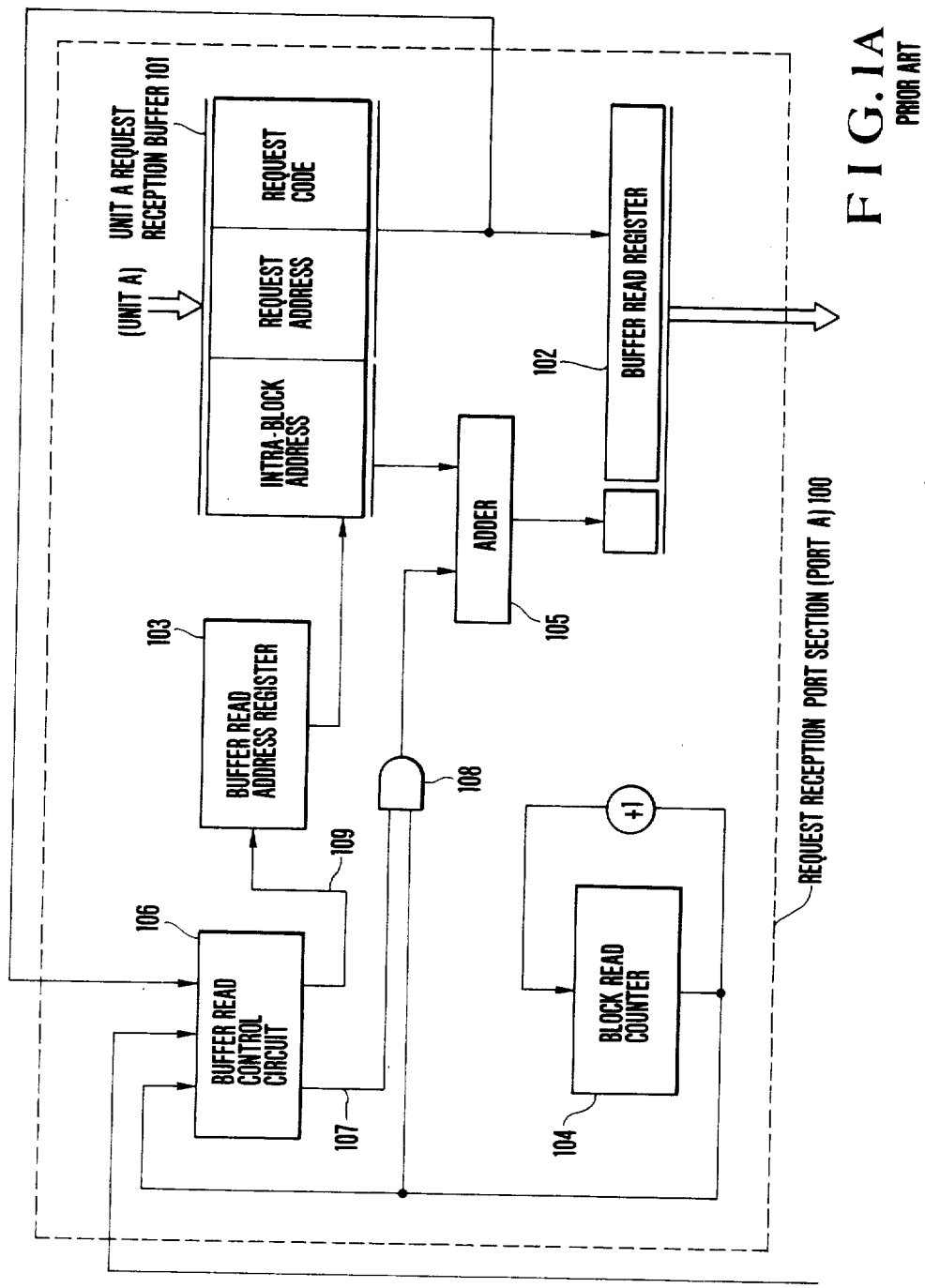
FIGS. 1, 1A and 1B are block diagrams showing a conventional memory access control apparatus.
Figures 1, 1B:
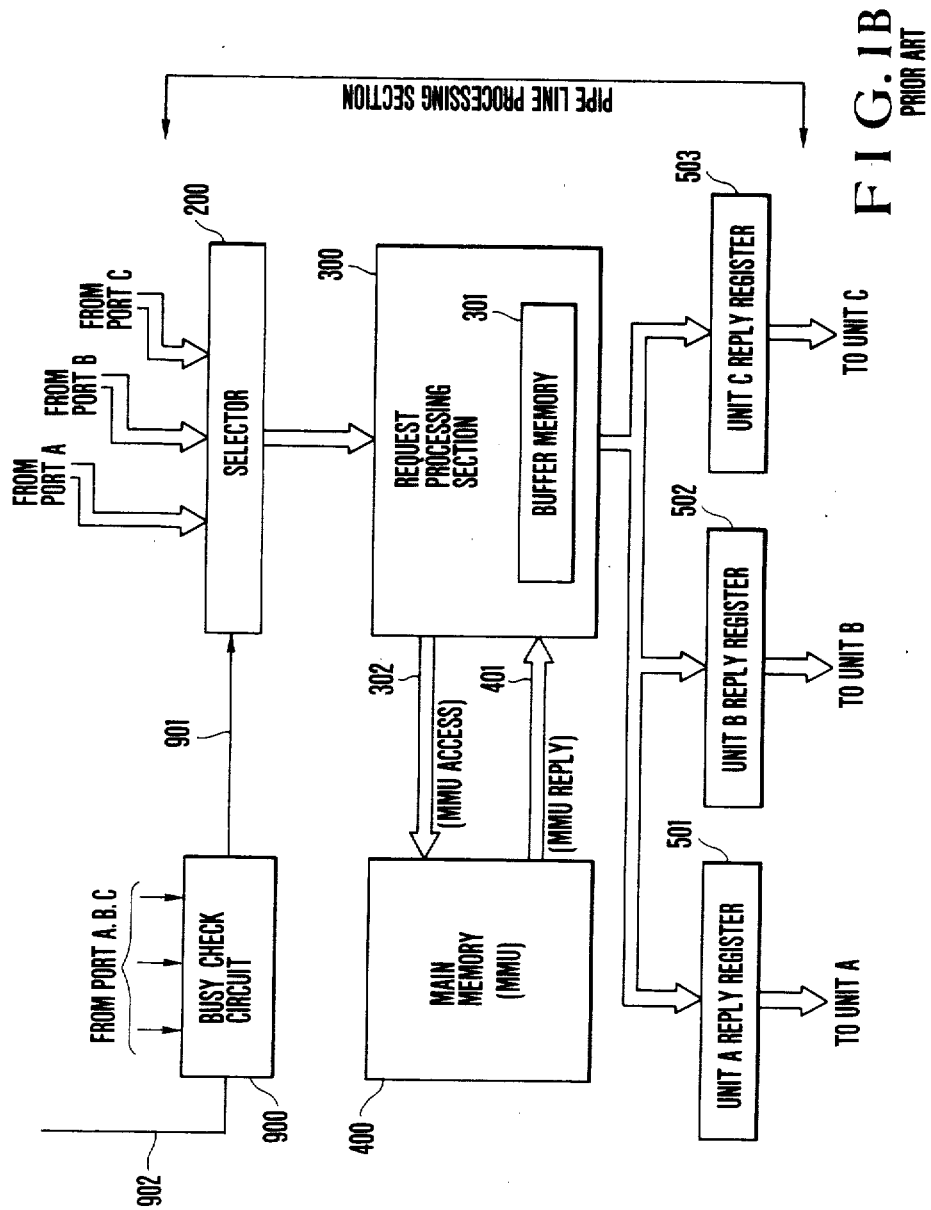

Referring to FIGS. 2A and 2B, the same reference numerals as in FIGS. 1A and 1B denote the same portions.

A request reception section 100' encircled by a broken line is for the unit A and will be referred to as a port A hereinafter. Ports B and C having the similar configurations are provided for the units B and C, respectively.

The port A 100' includes a unit A request reception buffer (to be referred to as a buffer hereinafter) 101, a buffer read register 102, a buffer read address register 103, a block read counter 104, an adder 105, a buffer read control circuit 106, an AND gate 108, a V-bit register 116, a cancel counter 117, and a buffer write address register 118.

An output from the port A 100', that is, an output from the buffer read register 102 is input to a selector 200 together with outputs from the ports B and C. The selector 200 selects one of the outputs from the ports A, B, and C in response to a selection signal 701 supplied from a busy check circuit 700 and outputs the selected output to a request processing section 300. The request processing section 300 is connected to a main memory unit 400 through lines 302 and 401. The line 302 is an MMU access line for accessing the main memory unit 400 by the request processing section 300. The line 401 is a transfer line (MMU reply line) for transferring data of the main memory unit 400 to a buffer memory 3450 in the request processing section 300.

An output from the request processing section 300 is transferred to the units A, B, and C through reply registers 501, 502, and 503, respectively.

The buffer 101 has areas for an intra-block address, a request address, a request code, and data. An output representing an intra-block address is input to one input of the adder 105. Outputs representing a request address, a request code, and data, respectively, are input to corresponding bit areas RA, RC, and DT of the buffer read register 102. The buffer read register 102 also has a bit area (#) for the unit number. A request code output from the buffer 101 is supplied to the buffer read control circuit 106.

The buffer read address register 103 supplies a read address to the buffer 101 and updates its output by an update signal supplied from the buffer read control circuit 106. In this embodiment, a single block read request is 64B data and divided into eight 8B read requests. More specifically, the content of the buffer 101 is read out to the buffer read register 102 eight times in response to a single block read request. The content of the buffer read address register 103 is not changed during a single block read operation. In other words, the content of the buffer 101 is updated upon the 8th read operation. Meanwhile, the content of the buffer read address register 103 is updated every time a request is read out from the buffer 101 when the request is other than a block read request.

The buffer write address register 118 is a register for holding a write address for writing a request in the buffer 101.

When a request is other than a block read request and not invalidated and received by the request processing section 300, the cancel counter 117 is updated by an update signal 109 supplied from the buffer read control circuit 106. When the request is a block read request, the cancel counter 117 is updated upon the 8th read operation. The counter 117 is also updated when a miss has occurred during a block read operation. In this case, the counter 117 holds a request read address following the block read request and outputs it to the buffer read address register 103 through a selecting circuit 119 that operates by a selection signal 111 supplied from the buffer read control circuit 106.

The block read counter 104 counts the eight 8B read requests in the block read request by an update signal 112 supplied from the buffer read control circuit 106. The counter 104 can take a value of "0" to "7" by being incremented by a +1 adder. The content of the counter 104 is output to the buffer read control circuit 106 and the selector 200. Thus, the request processing section 300 can determine the number of the received 8B read requests. In other words, the content of the counter 104 serves as a flag for notifying the number of replies to be supplied to the unit that has sent the request, i.e., the unit A when a miss has occurred in a block read operation. The output from the counter 104 is also input to one input of the AND gate 108. The other input of the counter 104 receives a valid signal 107 which is output from the buffer read control circuit 106 and represents a block read operation. An output from the AND gate 108 is input to the other input of the adder 106. More specifically, the adder 105 adds an output representing an intra-block address of the buffer 101 and an output from the block read counter 104 during a block read operation.

In addition to the above operation, the buffer read control circuit 106 receives an RC-bit output from the buffer read register 102, a block read cancel signal group 600 from the request processing section 300, and a unit A available signal 702 from the busy check circuit 700, and outputs invalidating signal 114 and set signal 115 to the V-bit register 116.

A unit A suppression flip-flop (F/F) 800 is set and reset by set and reset signals 601 and 602, respectively, sent from the request processing section 300, and an output therefrom is supplied to the busy check circuit 700.

Figures 3, 3A:
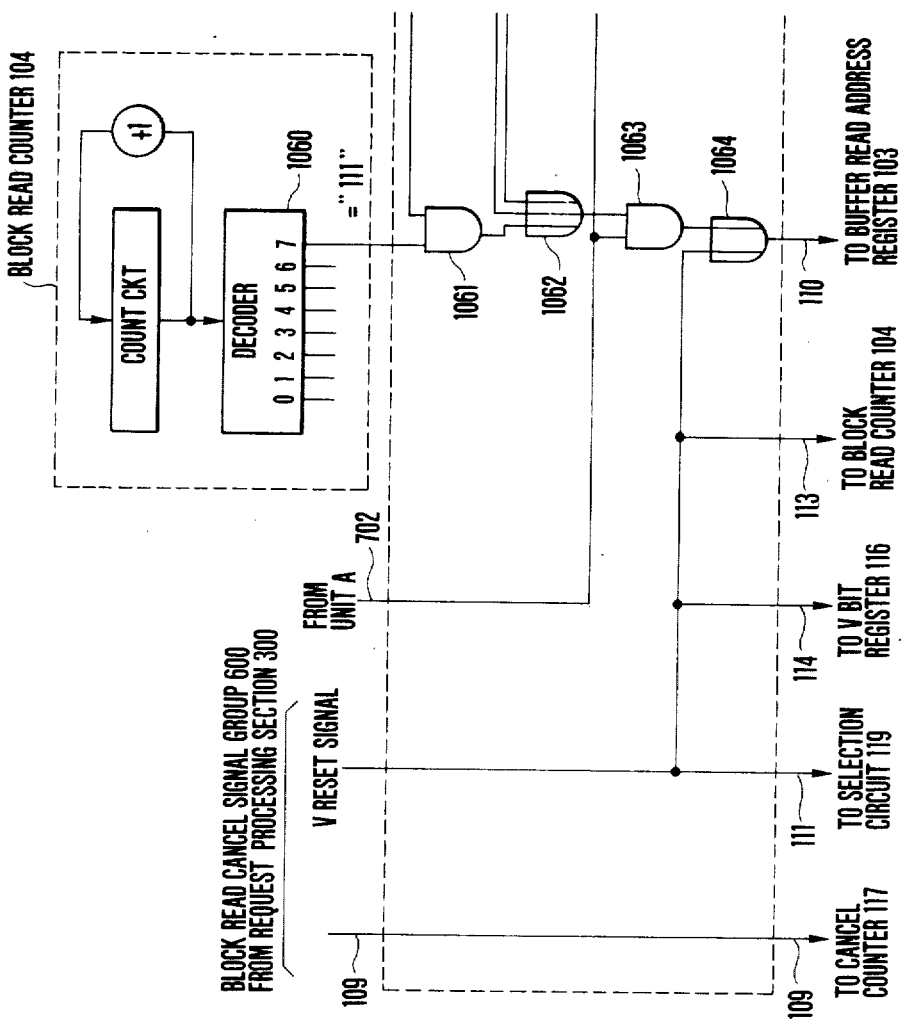
FIGS. 3, 3A and 3B are circuit diagrams of an embodiment of a buffer read control circuit 106 shown in FIG. 2.
Figure 3B:
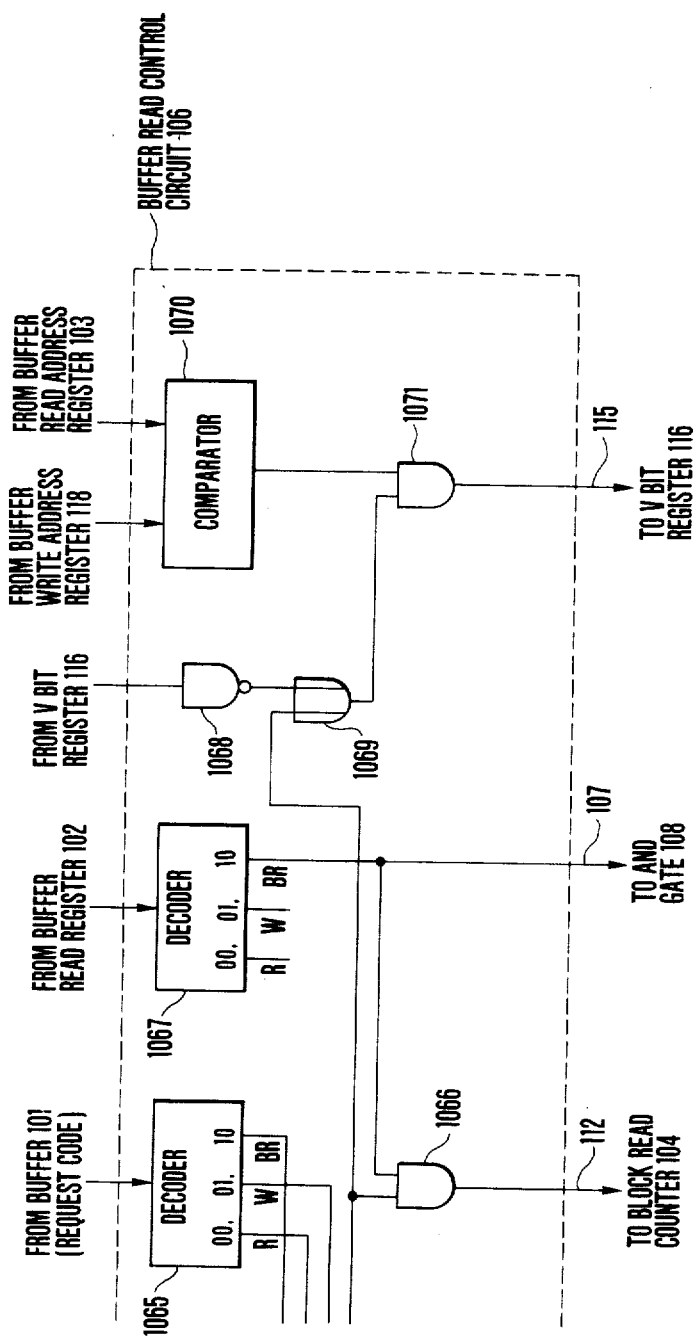

FIGS. 3A and 3B are circuit diagrams showing an example of the buffer read control circuit 106 shown in FIGS. 2A and 2B.

Referring to FIGS. 3A and 3B, a decoder 1060 is included in the block read counter 104. When the count of the counter 104 is "7", "1" is output from a terminal 7 of the decoder 1060. A decoder 1065 receives a request code output from the buffer 101 and sets a "1" output at its R, W, or BR terminal in response to a request code 00, 01, or 10 representing read, write, or block read operation. An output from the terminal 7 of the decoder 1060 is ANDed by an AND gate 1061 with an output from the BR terminal of the decoder 1065, and the result is input to an input of an OR gate 1062. Both outputs from the R and W terminals of the decoder 1065 are input to the OR gate 1062. An output from the OR gate 1062 is input to an AND gate 1063, ANDed with a unit A available signal 702, and input to an input of an OR gate 1062. An output from the OR gate 1062 is input to the buffer read address register 103 through an AND gate 1063 and an OR gate 1064 as an update signal 110.

A decoder 1067 receives a request code output RC from the buffer read register 102 and sets its output terminal R, W, or BR at "1" in response to the request code 00, 01, or 10. An output at the BR output terminal of the decoder 1067 is supplied to an AND gate 108 as the valid signal 107 representing that a block request is being processed, and ANDed by an AND gate 1066 with the unit A available signal 702. An output from the AND gate 1066 is input to the block read counter 104 as an update signal 112.

An output from the V register 116 is input to an OR gate 1069 through a NAND gate 1068 and ORed with the unit available signal 702. An output from the OR gate 1069 is input to an input of an AND gate 1071. An output from a comparator 1070 is input to the other input of the AND gate 1071. The comparator 1070 compares outputs from the buffer read and write address registers 103 and 118. When these outputs do not coincide with each other, the comparator 1070 outputs a signal "1" representing that an access request in the buffer 101 is present. An output from the AND gate 1071 is input to the V bit register 116 as a set signal 115.

Meanwhile, a block read cancel signal group 600 output from the request processing section 300 to the buffer read control circuit 106 comprises the update signal 109 itself of the cancel counter 117 and a V reset signal. The V reset signal serves as the invalidating signal 114 for the buffer read register 102, a reset signal 113 for the block read counter 104, and the selection signal 111 for the selection circuit 119. Simultaneously, the V reset signal is ORed by an OR gate 1064 with an output from the AND gate 1063 and input to the buffer read address register 103 as the update signal 110.

The buffer read control circuit 106 having the above arrangement controls a read operation of the buffer 101 in the following manner.

(1) When the request is other than a block read request (that is, the request code 00 or 01), the update signal 110 is set to "1" every time a read operation from the buffer 101 is performed. The valid signal 107 is set to "0" and the intra-block address of the buffer 101 is read out without being updated. When the request is not invalidated and received by the request processing section 300, the update signal 109 is set to "1" and updates the cancel counter 117. The selection signal 111 is normally "0" and an output from the buffer read address register 103 is selected, and is set to "1" when a miss has occurred and the block read cancel signal group 600 is generated, thereby selecting an output from the cancel counter 117.

(2) When the request is a block read request, the update signal 110 output to the buffer read address register 103 is set to "1" only when the count of the block read counter 104 is "7" and a read operation from the buffer 101 is performed. The valid signal 107 becomes "1" during a block read operation, and the intra-block address of the buffer 101 is thus updated 8 times every time a read operation from the buffer 101 is performed.

When a miss has occurred in the block read request input to the request processing section 300, the respective signals of the block read cancel signal group 600 are set to "1" and are output to the buffer read control circuit 106. As a result, the update signal 109 for the cancel counter 117, the selection signal 111, the reset signal 113 for the block read counter 104, and the update signal 110 for the buffer read register 103 are set to "1", the count of the block read counter 104 is set to "0", which is the initial value, and the content of the buffer address register 103 is updated by the updated count of the cancel counter 117 (the cancel counter 117 holds the address of the request subsequent to the block read request). In addition, the invalidating signal 114 for the V bit register 116 is set to "1" and the 8B read request held by the buffer read register 102 is invalidated. As a result, a request which is valid next to the block read request is set in the buffer read register 102. More specifically, when a miss has occurred in one 8B read request during a block read operation, all the 8B read requests following the missed read request that belong to the block read operation are invalidated, and the next new request is executed. The operation of the request processing section 300 in this case will be described later.

Figure 4A:
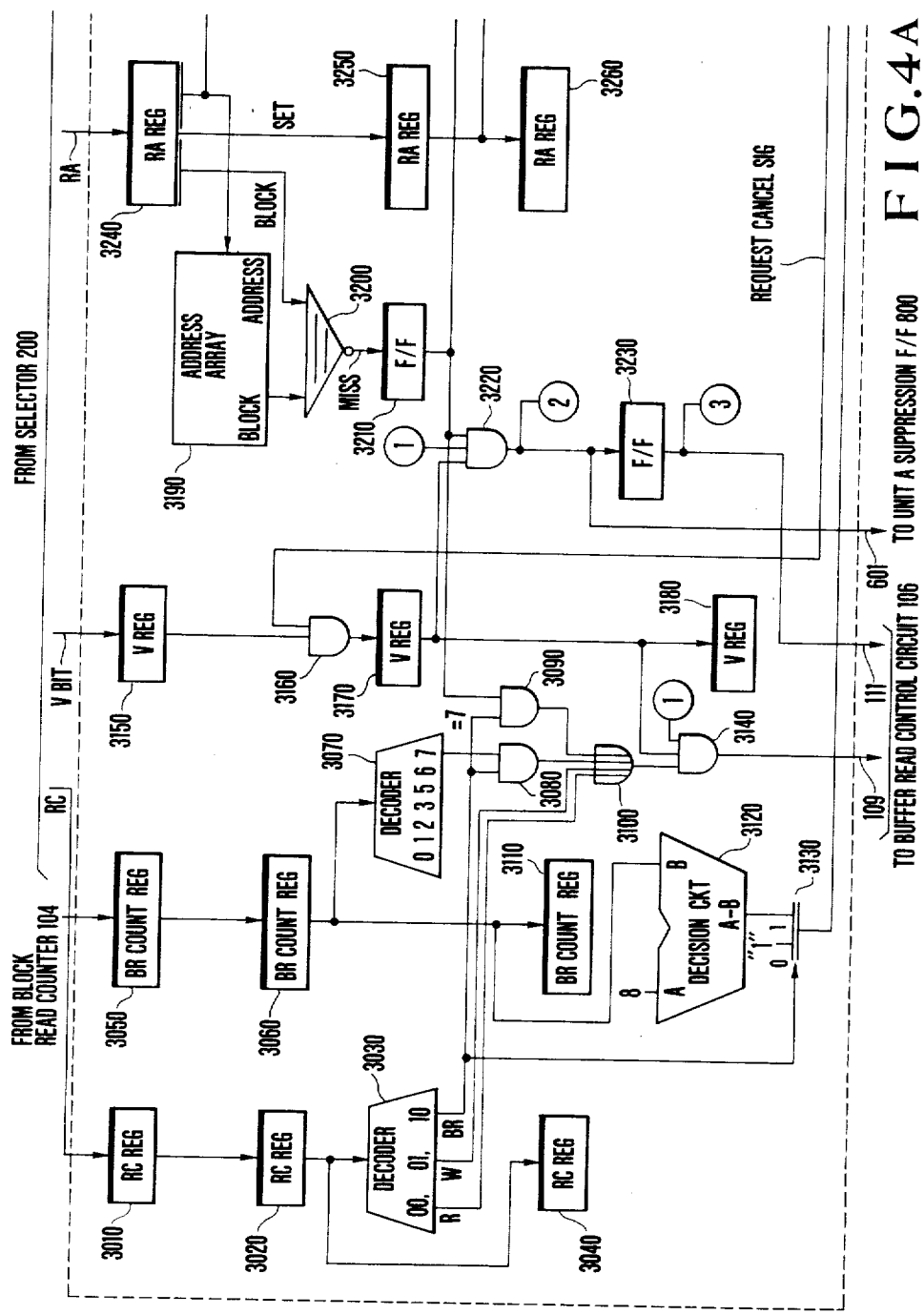

FIGS. 4A and 4B are circuit diagrams showing in detail an embodiment of the request processing section 300 shown in FIGS. 2A and 2B.

In this embodiment, the pipeline consists of three stages.

Figure 5:
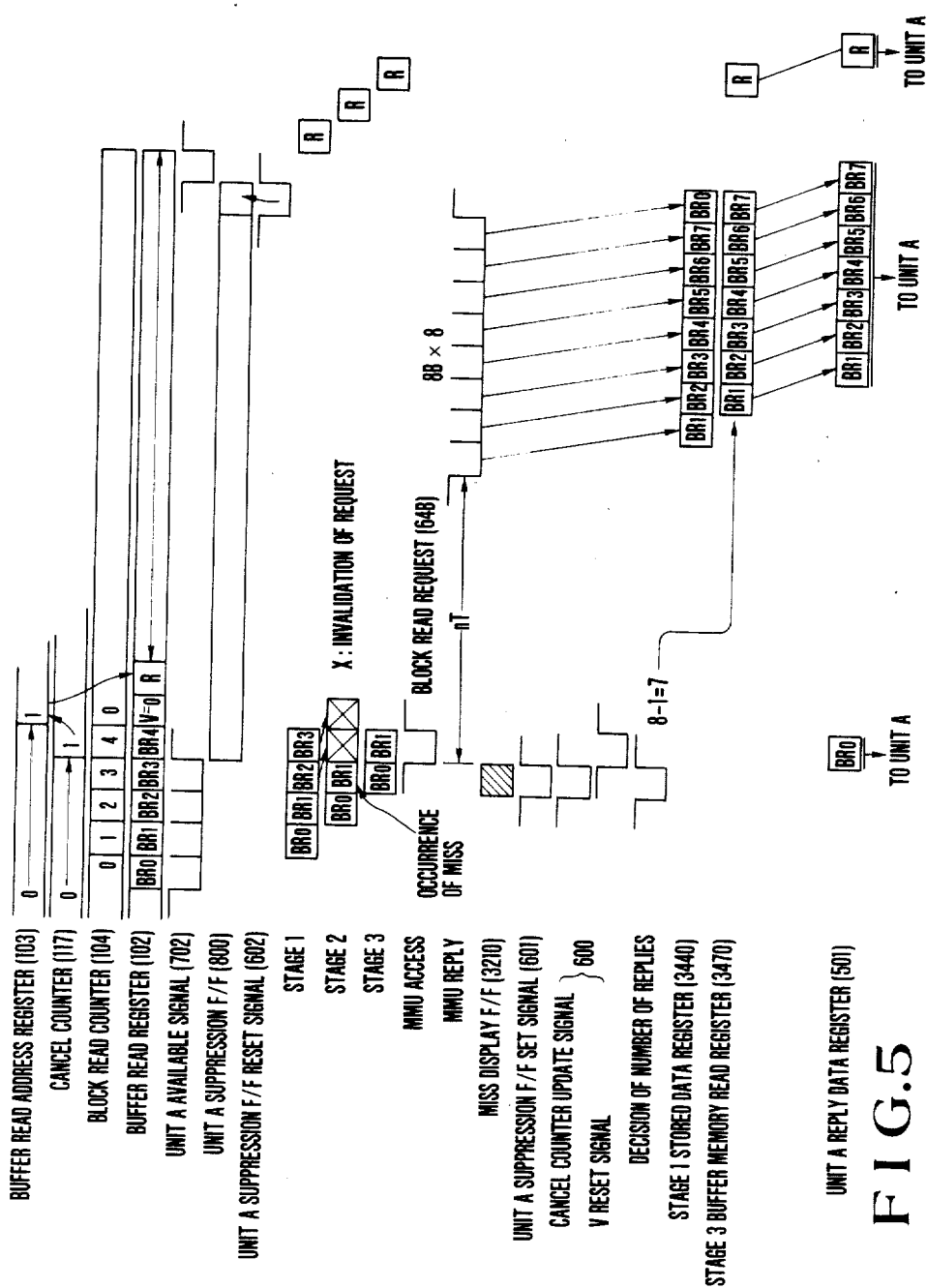
FIG. 5 is a timing chart of the operation of the memory access control apparatus according to the embodiment shown in FIGS. 2A, 2B, 3A, 3B, 4A and 4B.

FIG. 5 is a timing chart showing the operation of the embodiment shown in FIGS. 2A, 2B, 3A, 3B, 4A and 4B, and shows a case wherein a miss has occurred in the second 8B read operation within a single block read operation. Referring to FIG. 5, reference symbol BRi denotes an ith 8B read operation and R denotes a read operation other than a block read operation.

The operation of the request processing section 300 when a miss has occurred during a block read operation will be described with reference to FIGS. 4A, 4B and 5.

When a request enters the pipeline, a request address is loaded in the RA register 3240, and thus an address array 3190 is retrieved in stage 1 to determine a hit/miss. When it is determined that a hit has occurred, a hit signal is supplied from a comparator 3200 and a flip-flop 3210 is set to "0". Then, under the control of an MMU access controller 3420, a read operation is performed from a buffer memory 3450 to a buffer memory read register 3460, and reply data is output from the register 3460 to the respective units A, B, and C through a buffer memory read register 3470 of stage 3.

When it is determined that a hit has not occurred, the output from the F/F 3210 is set at "1". This "1" output is supplied to the MMU access controller 3420 and AND gates 3090 and 3220. An output from the AND gate 3090 is supplied to one input of an OR gate 3100 when the request is a block read request (when the BR terminal of the decoder 3030 is at "1").

Referring to FIGS. 4A and 4B, the circuit including a # register 3270 for receiving the number of the unit to a NOR gate 3370 outputs a request cancel signal for invalidating a request that is successively supplied from the same unit to the pipeline from its NOR gate 3370. The request cancel signal is input to an AND gate 3160 and ANDed with a V bit supplied from the port A 100'. The ANDed output of the AND gate 3160 is input to the other input of the AND gate 3220 via a V register 3170. More specifically, when a miss has occurred, the V bit becomes "1" and the request cancel signal becomes "1", a set signal 601 for a unit A suppression F/F 800 is generated by the AND gate 3220. Then, the following processing is suppressed, and a V reset signal within the block read cancel signal group 600 is input to the buffer read control circuit 106 of the port A 100' from the F/F 3230 of stage 3, thus causing the operation described above.

When a reply is sent back from the main memory unit 400 and miss processing is completed, a reset signal 602 is generated to reset the unit A suppression F/F 800. When the output from the F/F 800 is "1", the request from the unit A cannot pass the busy check performed by the busy check circuit 700, i.e., the request is held.

The update signal 109 for the cancel counter 117 is set to "1" when at least one of the inputs to the OR gate 3100 is set at "1" and the V register 3170 is set at "1", that is, (1) when a read request other than a block read request or a write request (the output terminal R or W of the decoder 3030 is "1") is not invalidated by the pipeline, (2) when the eighth 8B read request within the block read request is not invalidated by the pipeline (an output from the AND gate 3080 that ANDs outputs from the BR terminal of the decoder 3030 and the "7" terminal of the decoder 3070), and (3) when a miss has occurred during a 64B block read operation (the comparator 3200, F/F 3210, AND gate 3090). Among these three cases, the case (3) is the characteristic of the memory access control apparatus of the present invention.

Referring to FIGS. 4A and 4B, a decision circuit 3120 is connected to the MMU access controller 3420 for controlling the number of replies when a miss has occurred during a block read operation. A selector 3130 normally selects "1" and, in case of a block read operation, selects an output from the decision circuit 3120. More specifically, a block read request among the 8 block read requests in which a miss has occurred can be obtained from the output of the block read counter 104 of the port A 100'. For example, when the count of the block read counter 104 is 3, a miss has occurred in the 4th 8B read request. The number of replies to be sent back to the unit A that has sent the request is determined to be $(8-3)=5$. Therefore, when a miss has occurred, a reply may be sent back to the unit A, that has sent the request, $(8-N)$ times assuming that N is the content of a block count register 3060 of stage 2.

As described above, in a block read operation, when a hit has occurred, since an 8B read request is output from the port A 100' 8 times, an 8B read request is performed 8 times. When a miss has occurred while the request is being sent from the port A (including the first and last 8B read requests), the block read cancel signal group 600 is generated by the request processing section 300 and supplied to the port A 100' and the following 8B read requests included in the same block read request are invalidated. A block read request is sent to the main memory unit 400 and its reply data is registered in the buffer memory unit 3450. Registration in the buffer memory unit 3450 is performed, and simultaneously $(8-N)$ replies are sent back to the unit A that has supplied the request. Therefore, when a miss has occurred during a block read operation, the following 8B read requests among the same block read request are invalidated and the next new request is read out. As a result, a step for executing the remaining 8B read requests of the same block read request after data is registered in the buffer memory 3450 by this miss is eliminated.

What is claimed is:

1. A memory access control apparatus comprising: a plurality of request reception sections, respectively connected to a plurality of units for supplying requests, of said units, dividing the block read request into a plurality of read requests and outputting the divided read requests; selector means for selecting one of outputs from said plurality of request reception sections and outputting the selected output; a request processing section for processing the request output from said selector means and outputting reply data to a corresponding unit; and a main memory connected to said request processing section; wherein said request reception section comprises counter means for counting the plurality of read requests of the block read request and outputting the obtained count to said request processing section through said selector means, and said request processing section comprises miss detecting means for detecting a miss during processing of a block read request, determining means for determining by an output from said counter means the number of replies to be supplied to said unit that has sent the request when said miss detecting means detects a miss, and means for receiving an output from said miss detecting means and outputting to said request reception section a signal for invalidating requests following the block read request, among the plurality of read requests, in which a miss has occurred.

2. An apparatus according to claim 1, wherein each of said request reception sections comprises buffer means for receiving a request from a corresponding unit, first and second addressing means connected to said buffer means such that either one thereof supplies a read address, read register means for sending outputs from said buffer means and said counter means to said request processing section through said selector means, and buffer read control means for receiving a signal representing that a read operation from said buffer means has been performed, a signal output from said miss detecting means of said request processing section, and an output from said counter means, and for outputting a signal for selecting either of said first and second addressing means, signals for updating contents of said first and second addressing means and said counter means, respectively, a signal representing that a block read request is being processed, and a signal for invalidating an operation of said read register means.

3. An apparatus according to claim 2, wherein said request processing section comprises means for sending to said buffer read control means a block read cancel signal group for switching from said first to said second addressing means in accordance with an output from said miss detecting means and updating said second addressing means when a miss has occurred during a block read operation.

4. An apparatus according to claim 1, wherein, when a miss has occurred during a block read operation, said determining means determines the number of replies to be supplied to said unit that has sent the request in accordance with a difference between a predetermined number and an output from said counter means.

5. An apparatus according to claim 1, wherein said miss detecting means compares a block address in said buffer means of said request processing section and a request address included in the request.

* * * * *